United States Patent
Zhang et al.

(10) Patent No.: US 10,318,519 B2
(45) Date of Patent: Jun. 11, 2019

(54) CONTROL LOGIC ANALYZER AND METHOD THEREOF

(75) Inventors: Qingshan Zhang, Shanghai (CN); Guoxia Zhang, Shanghai (CN); Zeng Yang, Shanghai (CN)

(73) Assignees: HARMAN INTERNATIONAL INDUSTRIES, INCORPORATED, Stamford, CT (US); HARMAN INTERNATIONAL (CHINA) HOLDINGS CO., LTD., Shanghai (CN)

( * ) Notice: Subject to any disclaimer, the term of this patent is extended or adjusted under 35 U.S.C. 154(b) by 561 days.

(21) Appl. No.: 14/410,545

(22) PCT Filed: Jun. 29, 2012

(86) PCT No.: PCT/CN2012/077927
§ 371 (c)(1),
(2), (4) Date: Jun. 25, 2015

(87) PCT Pub. No.: WO2014/000276
PCT Pub. Date: Jan. 3, 2014

(65) Prior Publication Data
US 2015/0331895 A1    Nov. 19, 2015

(51) Int. Cl.
*G06F 19/00*    (2018.01)
*G06F 16/23*    (2019.01)
(Continued)

(52) U.S. Cl.
CPC ....... *G06F 16/2365* (2019.01); *B60N 2/0244* (2013.01); *B60N 2/5685* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,898,652 A | 8/1975 | Rashid | |
| 5,329,612 A * | 7/1994 | Kakazu | G05B 13/028 706/59 |

(Continued)

FOREIGN PATENT DOCUMENTS

| | | |
|---|---|---|
| CN | 1821911 A | 8/2006 |
| CN | 1900856 A | 1/2007 |

(Continued)

OTHER PUBLICATIONS

International Serach Report for PCT/CN2012/077927, dated Apr. 4, 2013.

*Primary Examiner* — Brian W Wathen
*Assistant Examiner* — Hung H Dang
(74) *Attorney, Agent, or Firm* — Artegis Law Group, LLP

(57) ABSTRACT

A control logic analyzer for controlling a plurality of devices is provided. The control logic analyzer comprises: a control logic decomposer configured to analyze control logics from different sources to identify devices involved in the control logics from the plurality of devices, and decompose the control logics into control instructions to be executed by the identified devices; and a potential conflict searcher configured to search a database for storing decomposed control logics and determine whether there is any potential conflict between the current control logic and the control logics previously stored in the database.

13 Claims, 4 Drawing Sheets

(51) Int. Cl.
  *B60W 50/08*   (2012.01)
  *G06F 16/245*   (2019.01)
  *G06F 16/248*   (2019.01)
  *G06F 16/28*   (2019.01)
  *B60N 2/56*   (2006.01)
  *B60N 2/02*   (2006.01)

(52) U.S. Cl.
  CPC ........... *B60W 50/08* (2013.01); *G06F 16/245* (2019.01); *G06F 16/248* (2019.01); *G06F 16/284* (2019.01)

(56) References Cited

U.S. PATENT DOCUMENTS

| | | | |
|---|---|---|---|
| 6,345,767 B1* | 2/2002 | Burrus, IV | B60H 1/00735 236/1 R |
| 2001/0003810 A1 | 6/2001 | Shinmura et al. | |
| 2002/0077996 A1 | 6/2002 | Regelski et al. | |
| 2004/0030560 A1* | 2/2004 | Takami | G10L 15/00 704/275 |
| 2004/0193416 A1* | 9/2004 | Emonts | G10L 15/187 704/251 |
| 2008/0046250 A1* | 2/2008 | Agapi | G10L 15/075 704/275 |
| 2008/0209506 A1 | 8/2008 | Ghai et al. | |
| 2008/0244696 A1 | 10/2008 | Bhola et al. | |

FOREIGN PATENT DOCUMENTS

| | | |
|---|---|---|
| CN | 102341808 A | 2/2012 |
| JP | 2012027722 A | 2/2012 |

\* cited by examiner

CONTROL LOGIC ANALYZER AND METHOD THEREOF

TECHNICAL FIELD

The present application relates to a control logic analyzer and a method thereof, and more particularly, relates to a control logic analyzer for controlling a plurality of devices in a separate room and a method thereof.

BACKGROUND

With the development of intelligent technologies, more comfortable experiences and easier operations are required in vehicles. However, various devices in a conventional vehicle can only be controlled by direct user instructions, and the system is not able to determine automatically whether it is necessary to operate a device based on the environment the vehicle is located in. For example, in a conventional vehicle, an air conditioner can only be powered on or off by pushing a button on a control panel.

As a result, conventional vehicles have the following drawbacks: 1) it is dangerous that a driver operates a device incorporated in the vehicle when driving; 2) a user operates a device because the user realizes that the environment is not comfortable, therefore the user does have uncomfortable experience even it only lasts a short time period; 3) if there are more than one device to be operated, it may not be easy and convenient for every user.

Therefore, there is need to solve the above mentioned issues.

SUMMARY

According to one embodiment of the present application, a control logic analyzer for controlling a plurality of devices is provided. The control logic analyzer comprises a control logic decomposer configured to analyze control logics from different sources to identify the devices involved in the control logics from the plurality of devices, and decompose the control logics into control instructions to be executed by the identified devices; and a potential conflict searcher configured to search a database for storing decomposed control logics and determine whether there is any potential conflict between the current control logic and the control logics previously stored in the database, wherein the control logic decomposer identifies the devices involved in the control logics by analyzing the keyword in the control logics.

In some embodiments, the control logic decomposer may further check whether the identified devices are ready, and reject the current control logic and send an error prompt to a user, if the identified devices are not ready.

In some embodiments, the potential conflict searcher may be configured to provide a conflict prompt and suspend the current control logic if a potential conflict exists.

In some embodiments, the potential conflict searcher may be configured to determine whether the current control logic can be merged with any of the control logics previously stored in the database.

In some embodiments, the potential conflict searcher may be configured to merge the current control logic and a control logic previously stored in the database to obtain a merged control logic, and replace the control logic previously stored in the database with the merged control logic, if the current control logic can be merged with the control logic previously stored in the database.

According to one embodiment of the present application, a control logic analyzing method is provided. The control logic analyzing method including: receiving a control logic in the form of a natural language; analyzing the control logic to identify the devices involved in the control logic from a plurality of devices; decomposing the control logic into a set of control instructions to be executed by the identified devices; searching a database for storing control logics to determine whether there is a potential conflict between the current control logic and the control logics previously stored in the database, and suspending the current control logic if there is a potential conflict between the current control logic and the control logics previously stored in the database.

In some embodiments, the method may further include sending a conflict prompt to a user if there is a potential conflict between the current control logic and the control logics preciously stored in the database.

In some embodiments, the method may further include checking whether the identified devices are ready before searching the database, if the involved devices are not ready, rejecting the current control logic and sending an error prompt to a user;

In some embodiments, the method further includes determining whether the current control logic can be merged with any of the control logics previously stored in the database, if the current control logic can be merged with a control logic previously stored in the database, merging the two control logics to obtain a merged control logic; and replacing the control logic previously stored in the database with the merged control logic.

According to one embodiment of the present application, a control logic analyzer is provided. The control logic analyzer configured to decompose a control logic of operating a device when a parameter reaches a predetermined value, into control instructions including: receiving data from a sensor configured to monitor the parameter, comparing the received data with the predetermined value to determine whether the parameter reaches the predetermined value, and instructing a controller to operate the device accordingly when the parameter reaches the predetermined value, wherein the control logic is in the form of a natural language.

In some embodiments, the control logic analyzer decomposes the control logic based on keywords in the control logic.

In some embodiments, the control logic analyzer is further configured to search a database to check whether there is any potential conflict between the current control logic and control logics previously stored in the database, and suspend the current control logic and output an error message if there is potential conflict.

In some embodiments, the control logic analyzer is further configured to check whether the current control logic can be merged with any of control logics previously stored in a database, merge the current control logic and a control previously stored in the database if the two control logics can be merged to obtain a merged control logic and replace the control logic previously stored in the database with the merged control logic.

In some embodiments, the control logic analyzer can be incorporated in a vehicle, wherein the sensor is selected from the group of velocity meter, fuel meter, timer, human detector, humidity sensor, and temperature sensor. In some embodiments, the device is selected from the group of air-conditioner, power window, seat heater, camera, and audio player.

The present application provides a solution which can offer automatic and continuous control services to users; bring intelligence to a universal control platform, and avoids potential conflicts between different control logics.

Others systems, method, features and advantages of the present application will be apparent to one skilled in the art upon the following figures and detailed description.

BRIEF DESCRIPTION OF THE DRAWINGS

The invention can be better understood with reference to the flowing drawings and detailed description.

DETAILED DESCRIPTION

Figure 1:
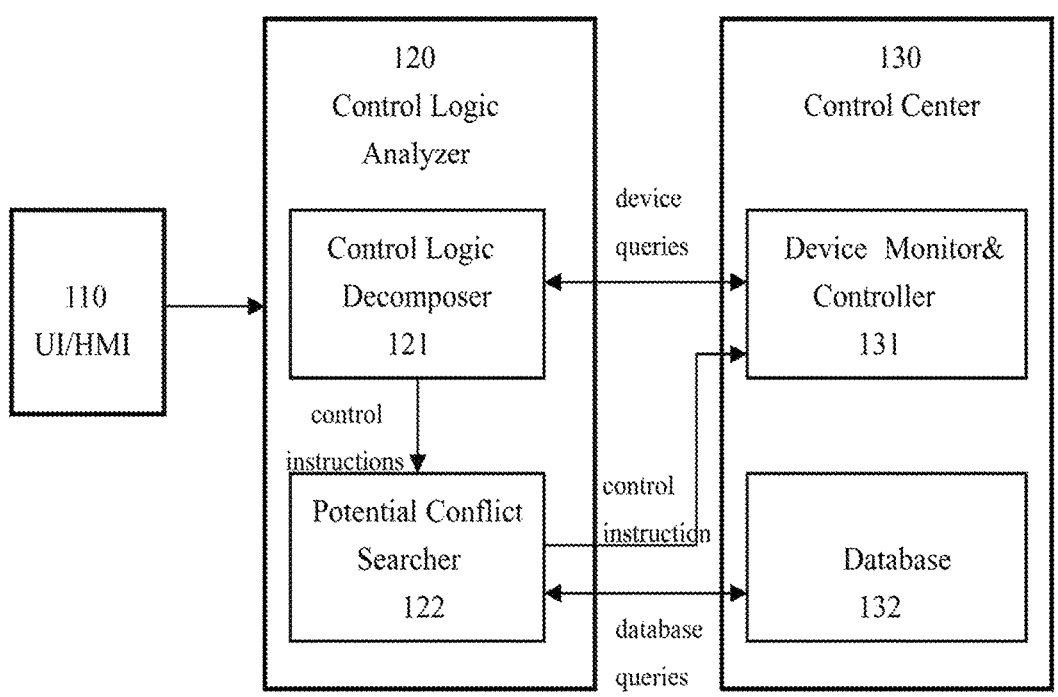
FIG. 1 illustrates schematic block diagram of a control logic analyzer used in one universal control platform according to one embodiment of the present application.

The present application provides a control logic analyzer for controlling a plurality of devices in a separated room and a method thereof. FIG. 1 shows a control platform 100 including a user interface or a human machine interface (UI/HMI) 110, a control logic analyzer 120, and a control center 130. As show in FIG. 1, the control logic analyzer 120 includes a control logic decomposer 121 and a potential conflict searcher 122. The control center 130 may include a device monitor and controller 131 and a database 132 that stores control logics. The control logic analyzer 120 receives control logics from the UI/HMI 110. The UI/HMI 110 may include any input means, such as keyboard, mouse, touch screen, microphone, etc. The control logic analyzer 120 analyzes the received control logics from different input source/means to figure out which device(s) (sensors/controllers) is/are involved in the control logics, and decomposes the control logics into a set of control instructions for execution by the involved devices. Further, the control logic analyzer 120 may search the database 132 to check whether there is a conflict between the current logic and the precious logics stored in the database 132.

Particularly, the control logic decomposer 121 in the control logic analyzer 120 receives control logics from different sources/means via an interface (not shown in figures), and determines the involved devices of the plurality of devices. The control logics defined by natural languages are translated into instructions that the control center 130 can execute. The control logic decomposer 121 goes through the control logic, finds out the devices involved in this control logic (e.g. if there is a keyword "temperature", some temperature sensor must get involved in this control logic) and their related parameters (such as higher than 28° C.) in the control logic, and then generates a monitoring (sensor) or controlling (controller) instruction for each of the devices. The devices may include any of an air-conditioner controller, a power window controller, a seat heater controller, a camera controller, an audio and/or video player controller, a speedometer, a fuel meter, radar, a GPS device, a light a switch, power source, a timer, or any device integrated in a control platform.

The control logic decomposer 121 may also check the status of the involved device. The control logic decomposer 121 sends device query requests to the device monitor and controller 131 in the control center 130, to get status reports of the devices. Then, the control logic decomposer 121 determines whether the involved device gets ready, i.e., the involved device is active or inactive. If the involved devices are not ready, the control logic decomposer 121 sends an error prompt to the user via the interface, and rejects the control logic. If the involved devices are ready, the control logic decomposer 121 decomposes the control logic into a set of control instructions for execution by the involved devices, and sends the set of control instructions to the potential conflict searcher 122 in the control logic analyzer 120. Then, the potential conflict searcher 122 searches the database 132 and checks whether a potential conflict exists between the current control logic and the previous control logics stored in the database 132. If there is a conflict, the potential conflict searcher 122 reports the conflict to the user, then the current control logic may be suspended, and the control logic analyzer 120 waits for the user's decision. For example, if the current control logic is "open the front power window if the velocity is below 45 km/h", while another control logic existing in the database is "close all the power windows if the velocity is beyond 35 km/h", there must a conflict between them. The potential conflict searcher 122 should reject the current control logic, or report such conflicts to users and suspend the current control logic before users solve the conflicts.

If there is not a conflict, the potential conflict searcher 122 may further searches the database 132 to check whether the current control logic can be merged with the previous control logics stored in the database. If it can be merged with the previous control logic, the previous control logic is removed from the database 132, and the merged control logic will be stored in the database 132. For example, if the current control logic is "open the front power window if the velocity is below 45 km/h" while another control logic existing in the database is "open the front power window if it does not rain", there is a chance to merge them into one control logic by combine the two conditions. The potential conflict searcher 122 removes the previous control logic from the database and merges it with the current one.

Figure 2:
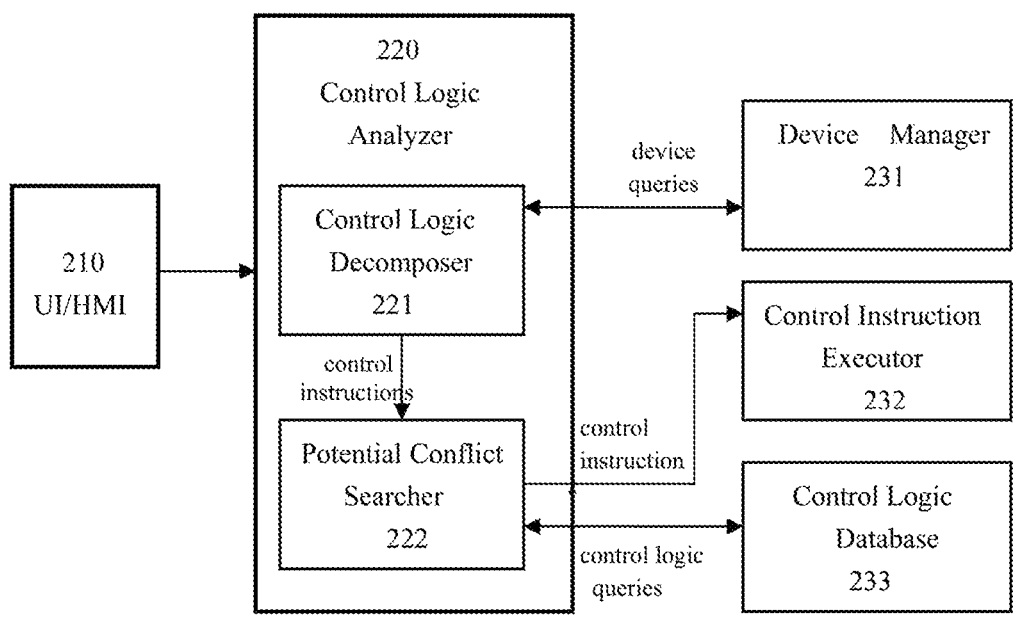
FIG. 2 illustrates a schematic block diagram of a control logic analyzer used in another universal control platform according to another embodiment of the present invention.

FIG. 2 illustrates a schematic block diagram of a control logic analyzer in another universal control platform according to another embodiment of the present application. As shown in FIG. 2, a control platform 200 includes a user interface or a human machine interface (UI/HMI) 210, a control logic analyzer 220, a device manage 231 for managing devices, a control instruction executor 232 for operating the devices to execute the control instructions, and a control logic database 233. Similar to that shown in FIG. 1, the control logic analyzer 220 includes a control logic decomposer 221 and a potential conflict searcher 222. The control logic analyzer 220 receives control logics from the UI/HMI 210. The UI/HMI 210 may comprise any input source/means, such as keyboard, mouse, touch screen, microphone, etc. The control logic analyzer 220 analyzed the received control logics from different input source/means to figure out which device(s) (sensors/controllers) is/are involved in the control logics, and decomposed the control logics into a plurality of instructions for execution by the involved devices. Further, the control logic analyzer 220 may search the control logic database 233 to check whether there is a conflict between the current logic and the precious logics stored in the control logic database 233.

Particularly, the control logic decomposer 221 in the control logic analyzer 220 receives control logics from different sources/means via an interface (not shown in figures), and determines the involved devices of the plurality of devices. The control logics defined by natural languages are translated into instructions that the control instruction executor 232 can execute. The control logic decomposer 221 goes through the control logic, finds out the devices involved in this control logic and their related parameters in the control logic, and then generates a monitoring (sensor) or controlling (controller) instruction for each of the devices. The devices may include any of an air-conditioner controller, a power window controller, a seat heater controller, a camera controller, an audio and/or video player controller, a speedometer, a fuel meter, radar, a GPS device, a light switch, power source, a timer, or any device integrated in a control platform.

The control logic decomposer 221 may also check the status of the involved device. The control logic decomposer 221 sends device query requests to the device manager 231, to get status reports of the devices. Then, the control logic decomposer 221 determines whether the involved device gets ready, i.e., the involved device is active or inactive. If the involved devices are not ready, the control logic decomposer 221 sends an error prompt to the user via the interface, and rejects the control logic. If the involved devices are ready, the control logic decomposer 221 decomposes the control logic into a set of control instructions for execution by the involved devices, and sends the set of control instructions to the potential conflict searcher 222 in the control logic analyzer 220. Then, the potential conflict searcher 222 searches the control logic database 233 and checks whether a potential conflict exists between the current control logic and the previous control logics stored in the database 233. If there is a conflict, the potential conflict searcher 222 reports the conflict to the user, then the current control logic may be suspended, and the control logic analyzer 220 waits for the user's decision. If there is not a conflict, the potential conflict searcher 222 may send the control instructions to the control instruction executor 232.

Figure 3:
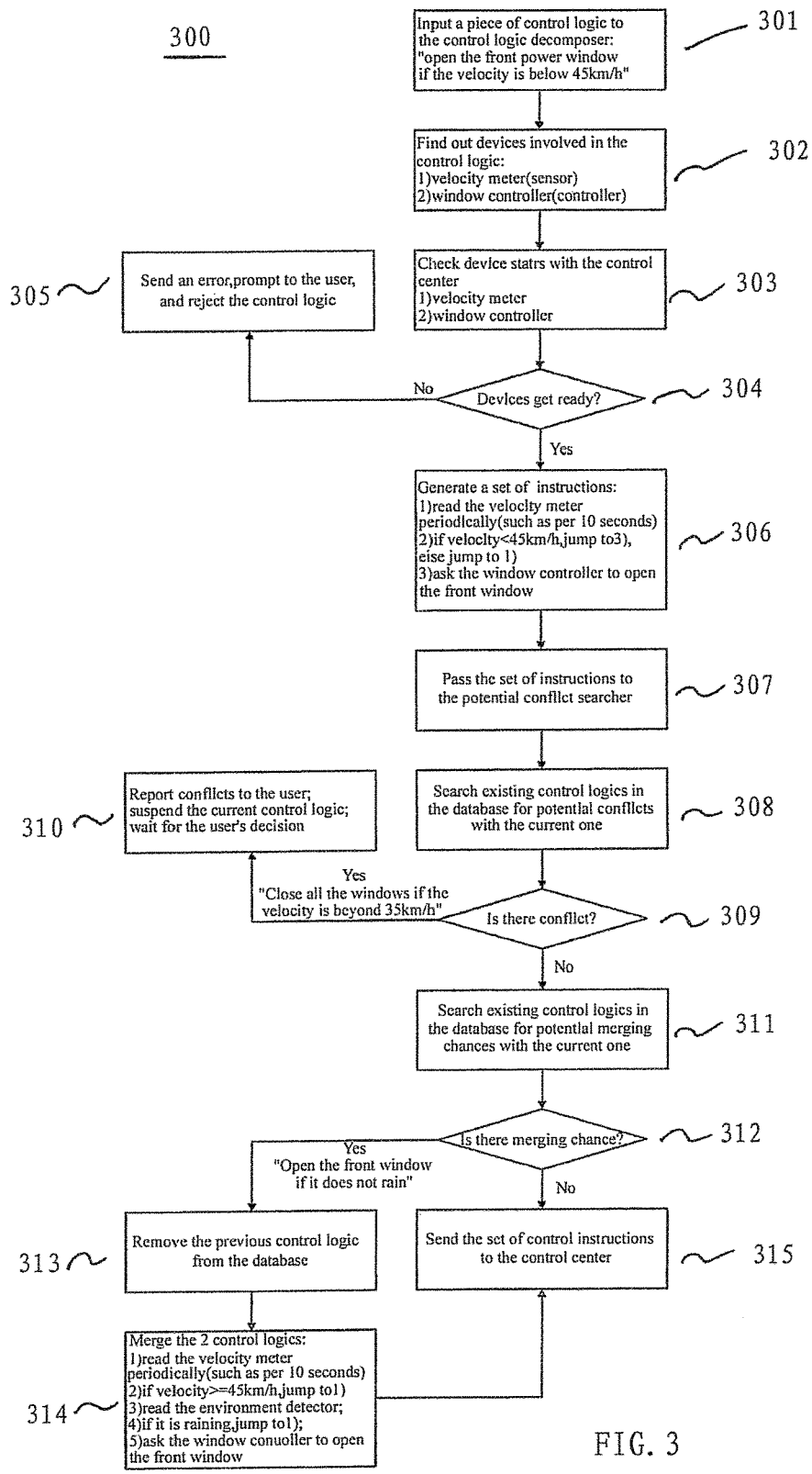
FIG. 3 illustrates a schematic flow chart of a control logic analyzing method according to one embodiment of the present application.

FIG. 3 illustrates a schematic flow chart of a control logic analyzing method 300 according to one embodiment of the present application. In 301, a control logic is received, e.g. "open the front power window if the velocity is below 45 km/h". In 302, the involved devices are found out i.e. a velocity meter (sensor) and a window controller (controller). The status of the velocity meter and the window controller are checked in 303. It determines whether the aforesaid two devices are ready in 304. If they are not ready, an error prompt is sent to the user and the control logic is rejected in 305. If the involved devices get ready, a set of control instructions are generated in 306, for example, the control logic "open the front power window if the velocity is below 45 km/h" can be decomposed into the following set of control instruction: 1) read the velocity meter periodically (such as per 10 seconds); 2) if velocity <=45 km/h, jump to 3), else jump to 1); and 3) ask the window controller to open the front window. In 307, the set of control instructions are passed to the potential conflict searcher for further progress. In 308, the potential conflict searcher searches the existing control logic stored in the database. In 309, it is determined whether there is a conflict between the current control logic and the previous control logic stored in the database. If there is a conflict, for example, the database has already stored a control logic of "close all the windows if the velocity is beyond 35 km/h", and it conflicts with the current control logic, then in 310, a conflict prompt is reported to the user, the current control logic is suspended and waiting for the user's decision. If there is no conflict, the method goes to 311, and searches the existing control logics in the database for merging chances with the current control logic. In 312, it is determined whether the current control logic can be merged with the control logics stored in the database. If cannot be merged, then jumps to 315, the set of control instructions generated in 306 are sent to a control center. If it can be merged, for example, the control logic of "open the front window if it does not rain" has been stored in the database, then in 313, the control logic stored in the database is removed and the merged control logic is, for example, "open the front window if the velocity is below 45 km/h and it does not rain". In 314, the merged control instructions can be generated, for example, 1) read the velocity meter periodically (such as per 10 seconds); 2) if velocity>45 km/h, jump to 1); and 3) read the environment detector; 4) if it is raining, jump to 1); 5) ask the window controller to open the front window. In 315, the set of control instructions generated in 314 are sent to a control center. Those skilled in the art can understand that 311~314 are not necessary.

Figure 4:
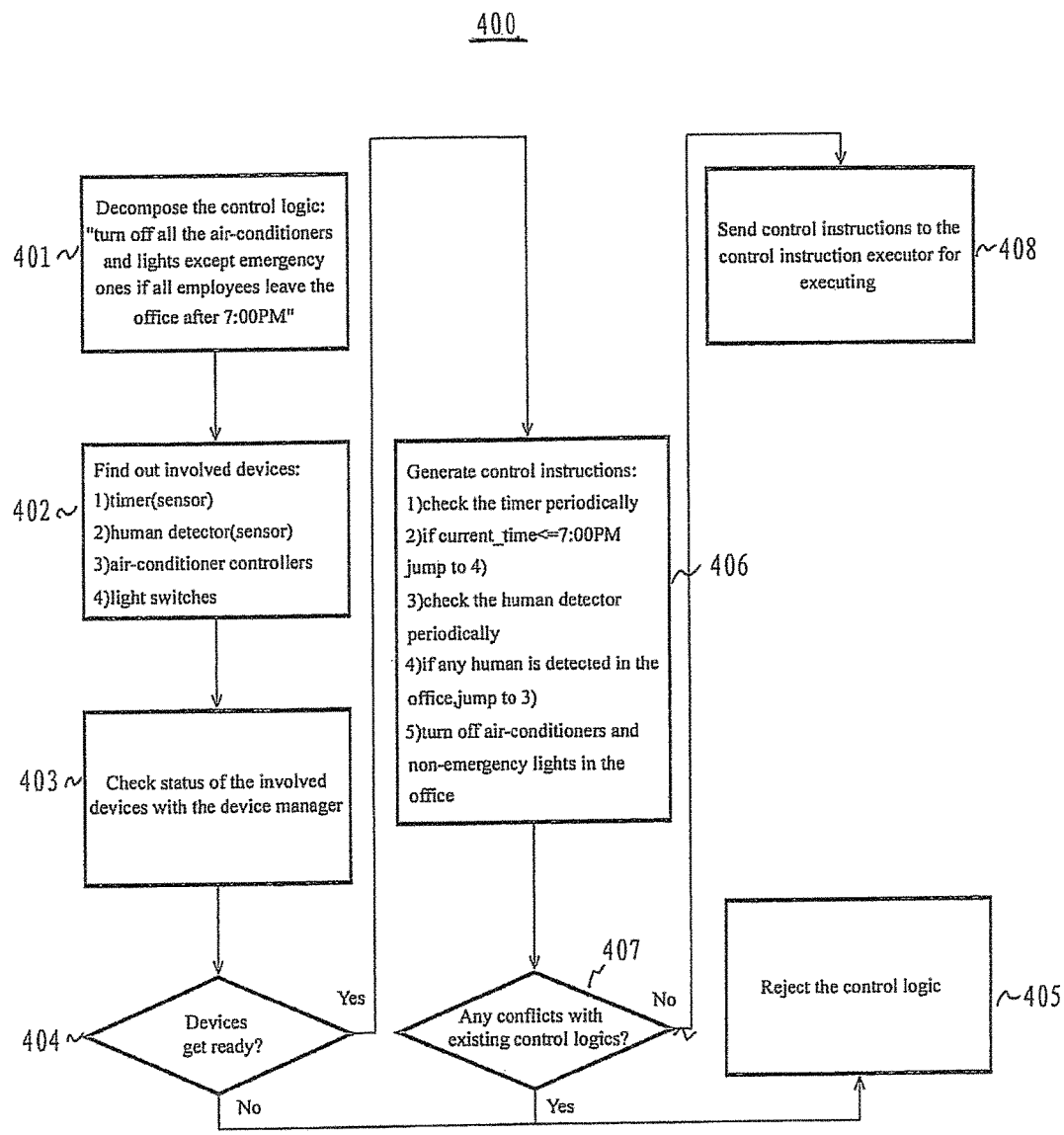
FIG. 4 illustrates a schematic flow chart of a control logic analyzing method according to another embodiment of the present application.

FIG. 4 illustrates a schematic flow chart of a control logic analyzing method 400 according to another embodiment of the present application. The control logic analyzing method 400 is performed in a control platform that is used in an office scenario. In such a method, control logics can be input by an administrator. The control logic analyzer decomposes and analyzes the control logic, and sends control instructions to the office equipment controller. The office equipment controller monitors the office environment, and executes control instructions accordingly.

Refereeing to FIG. 4, in 401, the control logic analyzer receives a control logic, for example, "turn off all the air-conditioners and lights except emergency lights if all employees leave the office after 7:00 PM". In 402, the involved devices can be found out, for example, they may include a timer (sensor), a human detector (sensor), air-conditioner controllers, and light switches. In 403, the control logic analyzer checks status of the involved devices with the device manager 231, in order to determine in 404 whether the involved devices are ready. If the involved devices are not ready, then the method jumps to 405. In 405, the control logic is rejected. If the involved devices are ready, in 406, control instructions are generated as: 1) check the timer periodically; 2) if current_time<=7:00 PM, then jump to 4); 3) check the human detector periodically; 4) if any human is detected in the office, then jump to 3); and 5) turn off air-conditioners and non-emergency lights in the office. In 407, it is determined whether there is a conflict between the current control logic and the previous control logics stored in the database 233. If there is a conflict, the method comes to 405. In 405, the current control logic is rejected. If there is not any conflict, then the method goes to 408. In 408, the control instructions generated in 406 are sent to the control instruction executor 232 for execution.

Those of skilled appreciate that the various illustrative logical blocks, modules and steps described in connection with the embodiments disclosed herein may be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic devices, discrete gate or transistor logic, discrete hardware components, or any combination thereof designed to perform the functions described herein. A general purpose processor may be a microprocessor, but in the alternative, the processor may be any conventional processor, controller, microcontroller, or state machine.

The steps of a method described in connection with the embodiments disclosed herein may be embodied directly in hardware, in a software module executed by a processor, or in a combination of the two. If the method is performed by software, the software may reside in software memory (not shown) in a suitable electronic processing component or system. The software in the memory may include executable instructions for implementing logical functions (that is, "logic" that may be implemented either in digital form such as digital circuitry or source code or in analog form such as analog circuitry or an analog source such as an analog electrical signal), and may selectively be embodied in any computer-readable medium for use by or in connection with an instruction execution system, apparatus, or device. The computer readable medium may selectively be, for example, but is not limited to, an electronic, magnetic, optical, electromagnetic, infrared, or semiconductor system, apparatus or device, such as, a RAM, a ROM, an EPROM, etc.

Moreover, the previous description of the disclosed embodiments is provided to enable any person skilled in the art to make or use the present invention. Various modifications to these embodiments will be readily apparent to those skilled in the art, and generic principles defined herein may be applied to other embodiments without departing from the sprit or scope of the invention. Thus, the present invention is not intended to be limited to the embodiments shown herein but is to be accorded the widest scope consistent with the principles and novel features disclosed herein.

The invention claimed is:

1. A control logic analyzer device that controls a plurality of devices, comprising:
   a control logic decomposer that analyzes control logics from different sources to identify devices involved in the control logics from the plurality of devices, decomposes the control logics into control instructions to be executed by the identified devices, and instructs a controller to operate the identified devices according to the control instructions; and
   a potential conflict searcher that:
      searches a database for storing decomposed control logics and determine whether there is any potential conflict between a current control logic and control logics previously stored in the database;
      if the current control logic and a first control logic previously stored in the database can be merged, merges the current control logic and the first control logic to obtain a merged control logic comprising a combination of the current control logic and the first control logic, wherein the database comprises a plurality of stored control logics, and the first control logic comprises a particular stored control logic of the database, wherein the first control logic specifies a first condition for performing a first operation, the current control logic specifies a second condition for performing the first operation, and the merged control logic specifies a merged condition for performing the first operation, the merged condition comprising a combination of the first condition and the second condition; and
      replaces the first control logic previously stored in the database with the merged control logic.

2. The control logic analyzer device of claim 1, wherein the control logic decomposer identifies the devices involved in the control logics by analyzing keywords in the control logics.

3. The control logic analyzer device of claim 1, wherein the control logic decomposer further checks whether the identified devices are ready, and reject the current control logic and send an error prompt to a user if the identified devices are not ready.

4. The control logic analyzer device of claim 1, wherein the potential conflict searcher further provides a conflict prompt and suspend the current control logic if a potential conflict exists.

5. A control logic analyzing method, comprising:
   receiving a control logic in the form of a natural language;
   analyzing the control logic to identify devices involved in the control logic from a plurality of devices;
   decomposing the control logic into a set of control instructions to be executed by the identified devices;
   instructing a controller to operate the identified devices according to the control instructions;
   searching a database for storing control logics to determine whether there is a potential conflict between a current control logic and control logics previously stored in the database;
   suspending the current control logic if there is a potential conflict between the current control logic and the control logics previously stored in the database;
   if the current control logic and a first control logic previously stored in the database can be merged, merging the current control logic and the first control logic to obtain a merged control logic comprising a combination of the current control logic and the first control logic, wherein the database comprises a plurality of stored control logics, and the first control logic comprises a particular stored control logic of the database, wherein the first control logic specifies a first condition for performing a first operation, the current control logic specifies a second condition for performing the first operation, and the merged control logic specifies a merged condition for performing the first operation, the merged condition comprising a combination of the first condition and the second condition; and
   replacing the first control logic previously stored in the database with the merged control logic.

6. The method of claim 5, further comprising sending a conflict prompt to a user if there is a potential conflict between the current control logic and the control logics previously stored in the database.

7. The method of claim 5, further comprising checking whether the identified devices are ready, before searching the database.

8. The method of claim 7, further comprising rejecting the current control logic and sending an error prompt to a user, if the identified devices are not ready.

9. The method of claim 5, wherein the devices involved in the control logic are identified by analyzing keywords in the control logic.

10. A control logic analyzer device that:

decomposes a control logic of operating a device when a parameter reaches a predetermined value, into control instructions comprising:

receiving data from a sensor that monitors the parameter, comparing the received data with the predetermined value to determine whether the parameter reaches the predetermined value, and instructing a controller to operate the device accordingly when the parameter reaches the predetermined value, where the control logic is in the form of a natural language;

if the current control logic and a first control logic previously stored in the database can be merged, merges the current control logic and the first control logic to obtain a merged control logic comprising a combination of the current control logic and the first control logic, wherein the database comprises a plurality of stored control logics, and the first control logic comprises a particular stored control logic of the database, wherein the first control logic specifies a first condition for performing a first operation, the current control logic specifies a second condition for performing the first operation, and the merged control logic specifies a merged condition for performing the first operation, the merged condition comprising a combination of the first condition and the second condition; and replaces the first control logic previously stored in the database with the merged control logic.

11. The control logic analyzer device of claim 10, wherein the control logic analyzer decomposes the control logic based on keywords in the control logic.

12. The control logic analyzer device of claim 10, that further searches a database to check whether there is any potential conflict between the current control logic and control logics previously stored in the database, and suspends the current control logic and outputs an error message if there is a potential conflict.

13. The control logic analyzer device of claim 10 being incorporated in a vehicle, wherein the sensor is selected from the group of velocity meter, fuel meter, timer, human detector, humidity sensor, and temperature sensor, the device is selected from the group of air-conditioner, power window, seat heater, and audio player.

* * * * *